United States Patent [19]

Obermann et al.

[11] Patent Number: 4,866,221

[45] Date of Patent: Sep. 12, 1989

[54] REMOTE POWER MIRROR SWITCH ASSEMBLY

[75] Inventors: George Obermann, Niles; Marek Brzozowski, Chicago, both of Ill.

[73] Assignee: Eaton Corporation, Cleveland, Ohio

[21] Appl. No.: 202,349

[22] Filed: Jun. 6, 1988

[51] Int. Cl.$^4$ ............................................. H01H 15/22
[52] U.S. Cl. .................................. 200/5 R; 200/16 D; 200/18
[58] Field of Search ........................ 200/5 R, 16 D, 18

[56] References Cited

U.S. PATENT DOCUMENTS

| | | |
|---|---|---|
| 2,895,021 | 7/1959 | Mekelburg ........................... 200/5 R |
| 2,916,566 | 12/1959 | Meyer et al. ......................... 200/5 R |
| 3,303,295 | 2/1967 | Davis .................................... 200/5 B |
| 4,315,113 | 2/1982 | Fisher et al. ......................... 200/5 R |
| 4,428,649 | 1/1984 | Main et al. ...................... 200/1 V X |
| 4,590,338 | 5/1986 | Suzuki ................................. 200/5 R |
| 4,611,102 | 9/1986 | Ishida .................................. 200/5 R |
| 4,698,463 | 10/1987 | Tanaka et al. ....................... 200/5 R |
| 4,698,464 | 10/1987 | Tanaka et al. ....................... 200/5 R |

Primary Examiner—A. D. Pellinen
Assistant Examiner—Morris Ginsburg
Attorney, Agent, or Firm—R. A. Johnston

[57] ABSTRACT

A switch assembly for remote selection and two-way operation of individual motors for vehicle rearview mirror adjustment. A quadulateral touch frame is gimballed by means of a nested yoke on a housing for movement about two orthogonal axes and is superposed for contacting an actuator frame having four spaced pins extending commonly therefrom through the housing, each for actuation of an individual switch mounted on a circuit board. User movement of any one of the four sides of the touch bar actuates a pair of the switches, only one of which is snap-acting. A separate selector nested in the touch frame operates sliding wipers for selected switching between pairs of contacts on the circuit board for selection of operational mode for the four main switches.

11 Claims, 3 Drawing Sheets

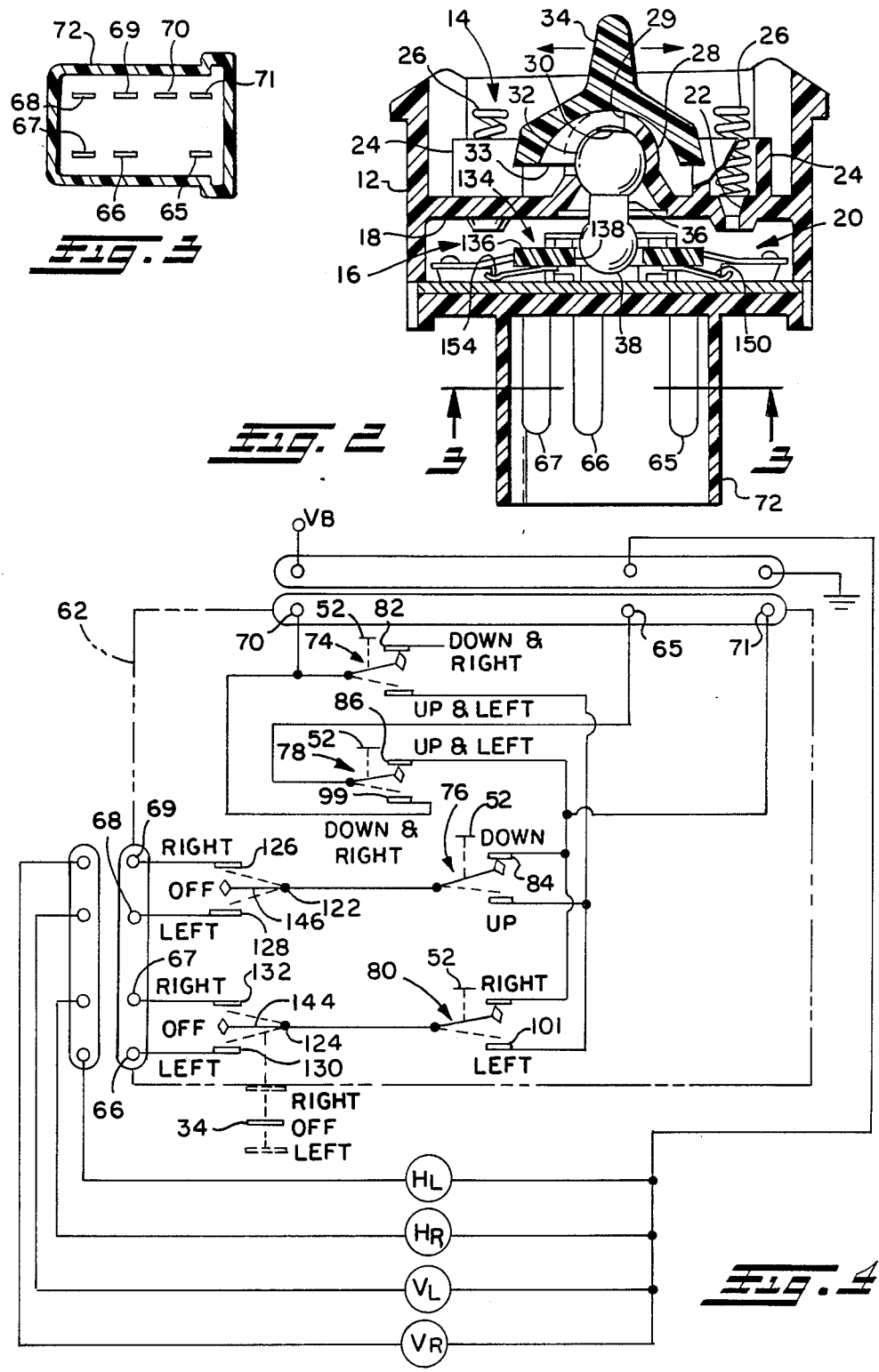

REMOTE POWER MIRROR SWITCH ASSEMBLY

BACKGROUND OF THE INVENTION

The present invention relates to multi-directional single actuator switch assemblies of the type in which movement of the actuator in any one of a plurality of directions actuates plural sets of switch contacts for multiple switching functions. Switches of this type are often employed in driver operated control switches for vehicle applications where it is desired to provide remote actuation by the vehicle driver of electric servoactuators for performing various accessory functions on the vehicle. In particular, it has been popular in recent times to provide multi-directionally actuated controls for remote electrically motor driven adjustment of door mounted rearview mirrors. In such automotive rearview mirror control of applications, it has been found desirable to provide a single lever actuator for bi-directional adjustment of the mirrors, with a commonly disposed selector for enabling the driver to choose between the lefthand and righthand door mirrors for adjustment. Common disposition of the left/right mirror selector and the bi-directional adjustment actuator has been found to be desirable because it enables the driver to tactically locate the mirror adjustment controls for added convenience.

In order to provide bi-directional mirror adjustment in a single actuator, it has been found necessary to provide four discrete modes of movement of the single actuator for up, down, left and right mirror adjustment. It is known to provide for mirror adjustment with such a single actuator by employing a single lever or stick-type actuator. However, this arrangement has required a separate location of the actuator for mode selection as between the left or right side door mirrors. Separate switch arrangements of this type have proven to be undesirable from a convenience view point and also have made tactile identification more difficult. Therefor, it has been desired to provide a remote mirror selector and actuator having the left/right mode selector centrally located and surrounded by a touch frame or bar which provided the desired direction of mirror adjustment upon touching the bar in the selected quadrant. In providing this latter type of actuator arrangement, the touch frame or bar is required to actuate separate switches upon movement in any one of the selected quadrants in order to provide the appropriate energization of the mirror adjustment motors. Upon movement of the touch bar or frame in the opposite quadrant, opposite movement of the mirror about the same axis is obtained.

Heretofore, remotely actuated switches for control of mirror adjustment servomotors have employed snap-acting switches for the purpose of preventing arcing and ensuring longer electrical contact life. However, where it is required to actuate a pair of such snap-acting switches by movement of the actuator in a selected quadrant, the non-simultaneous or sequential audible snapping of the switches has proven to be undesirable from a vehicle occupant standpoint.

Accordingly, it has been desired to find a way or means of providing a remote actuator for plural switches to be employed in remote motorized adjustment of automotive side door mirrors and it has further been desired to provide such switches and to provide a low-cost and compact switch arrangement that is readily discernible tactically and yet provides snap-action to certain of the switches employed therein and yet eliminates the sequential snapping of the switches upon user actuation.

SUMMARY OF THE INVENTION

The present invention provides a switch assembly having a common actuator frame for selectively actuating a plurality of switches for forward and reverse actuation of remotely located servomotors and has a centrally disposed selector nested in a touch frame or bar for selecting from a plurality of remote locations to be controlled by the touch frame. The touch frame is gimballed about an axis, a yoke which is in turn gimballed about a mutually perpendicular axes on the switch body; and, the touch frame contacts a floating actuator frame into which the yoke is nested. The actuator frame has a plurality of spaced pins extending therefrom which extend through apertures provided in the body for individually actuating a plurality of separate control switches disposed on a printed circuit board for controlling remote servomotors in forward and reverse running for providing the desired function. The centrally mounted selector switch nested within the touch frame, yoke and floating actuator pivotably engages wipers movable on electrical contact pads provided on a printed circuit board for desired switching to select the particular remote servos to be operated by the touch frame switches. The switch assembly of the present invention is particularly suitable for driver selection and control of motorized adjustment of door-mounted outside rearview mirrors in automotive vehicle applications.

User actuation of any selected quadrant of the touch frame provides the desired up/down or left/right servomotor actuation for adjustment remotely of the selected left or right door rearview mirror.

Depression of any one quadrant of the touch frame effects actuation of a pair of the switches with only one of the pair having a snap-acting mechanism audible to the user. The present invention thus provides a unique, compact and low cost multi-position single actuator control switch assembly which is readily identified tactically for selection and operation of remotely controlled servos.

BRIEF DESCRIPTION OF THE DRAWINGS

FIG. 2 is a section view taken along section indicating lines 2—2 of FIG. 1;

FIG. 3 is a section view taken along section indicating lines 3—3 of FIG. 2;

FIG. 4 is an electrical schematic of the switch assembly employed for remote ajustment of left and right vehicle rear view mirrors;

DETAILED DESCRIPTION

Figure 1:
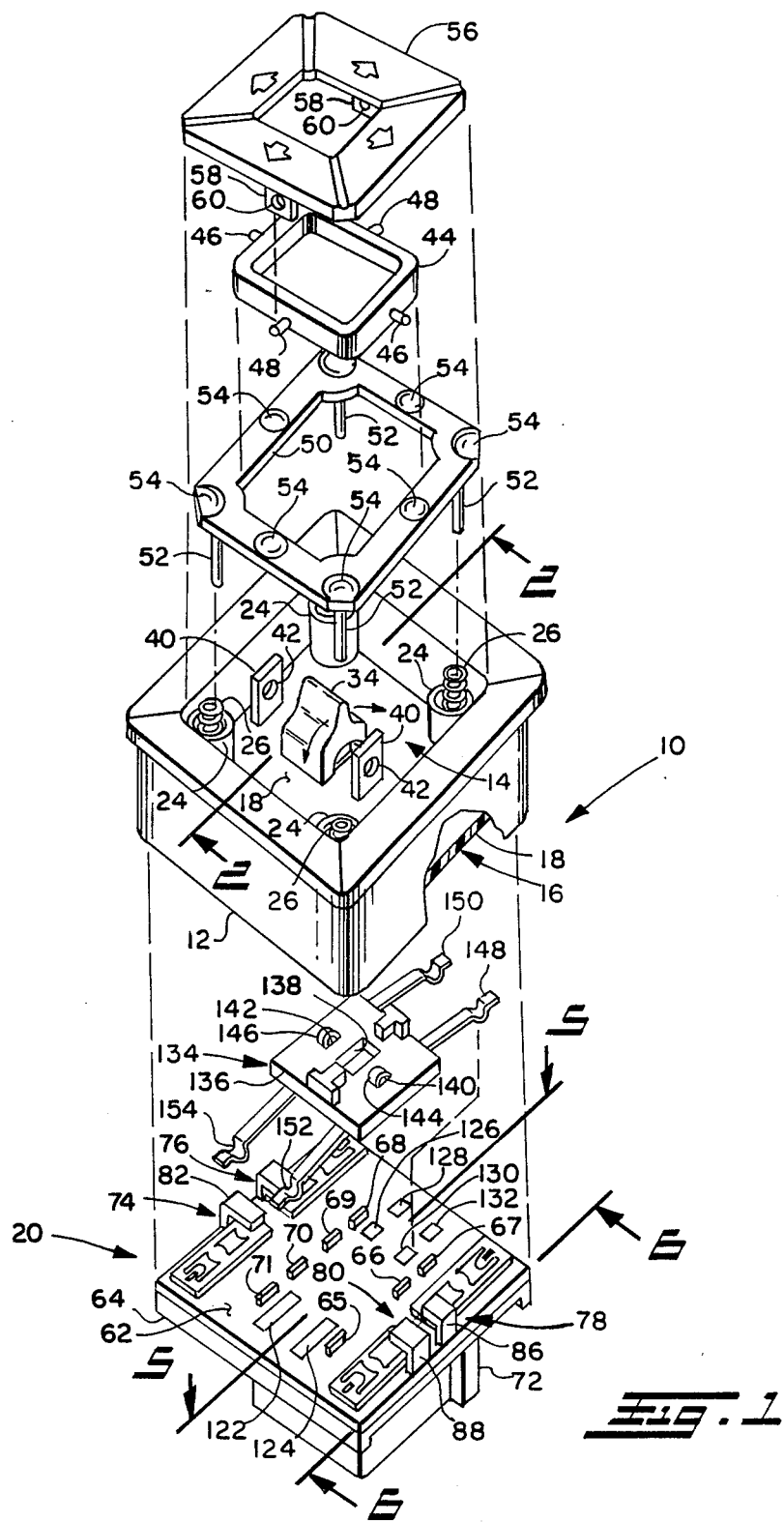
FIG. 1 is a perspective exploded view of the switch assembly of the present invention.

Referring to FIG. 1, the switch assembly indicated generally at 10 is illustrated in an exploded view and has a housing or body 12 having an upper or actuator cavity indicated generally at 14 formed in the body. In the presently preferred practice, actuator cavity 14 has a quadrilateral configuration. A lower or switching cavity 16 is separated from the actuator cavity 14 by partition 18 for receiving therein the electrical switching mechanisms indicated generally at 20 as will hereinafter be described.

The partition 18 has formed therein four spaced apertures 22, each of which is located generally in a corner region of the cavity 14. An annular boss 24 surrounds each aperture and extends upwardly from the partition and has a coil spring 26 received therein.

Partition 18 has on the upper surface thereof in cavity 14 a pair of spaced stanchions, one of which is shown at 28 in FIG. 2, each of the stanchions, such as 28, has a curved socket 30 having slot 29 formed therein; and, a spherically curved surface 32 formed on a portion of a selector lever 34 and supported by a web 33 is journalled in the socket 30 and disposed between the stanchions such as 28. The selector lever 34 extends outwardly of the cavity 14 for tactile location and operation by a user. An arm portion 36 of lever 34 extends downwardly from the spherically curved surface 32; and, the arm portion 36 has a generally flat rectangular cross-section with a two dimensionally curved surface 38 provided on the end thereof. The selector lever 34 is thus mounted in the stanchions such as 28 for pivotal movement about socket 30 in the direction indicated by the arrows in FIG. 2.

Referring to FIG. 1, the housing partition 18 has provided on the upper surface thereof in cavity 14 a pair of vertically upstanding spaced stanchions 40 disposed in spaced parallel relationship on opposite sides of the selector lever 34. Each of the stanchions 40 has an aperture 42 provided therethrough. A yoke frame 44 having a generally quadrilateral shaped configuration has a first pair of trunnions 46 extending outwardly from opposite sides thereof and in axial alignment. A second pair of trunnions 48 is disposed to extend outwardly from the remaining opposite sides of the yoke 44 and in axial alignment along an axis at right angles to the axis of trunnions 46. The yoke 44 is received in the actuator cavity 14 with the selector lever 34 extending upwardly therethrough in nested arrangement; and, the trunnions 46 are each journalled in one of the apertures 42 provided in the stanchions 40. The yoke frame 44 is thus gimballed on the trunnions 46 for pivotal movement about an axis extending through the apertures 42.

An actuator frame 50 having a generally quadrilateral configuration has a plurality of spaced actuator pins 52 extending downwardly therefrom with one of the pins disposed in each corner region of the actuator frame 50. The pins 52 extending from the actuator frame 50 are precisely located such that one of the pins is received in the center of each of the coil springs 26 and extends downwardly through the aperture 22 formed in the partition 18 of the housing. The pins are of sufficient length so as to extend downwardly into the actuation cavity 16 of the housing.

The undersurface of the frame 50 rests on the upper end of each of the springs 26 and the frame 50 is thus in resiliently biased floating arrangement within the actuator cavity 14 and also surrounds the yoke 44 which is thus in nested arrangement therewith. The upper surface of the actuator frame 50 has a plurality of convex or raised curved surfaces 54 disposed thereabout and particularly in each corner thereof for acting as contact surfaces as will hereinafter be described.

A touch bar or frame 56 having a generally quadrilateral configuration has a pair of second stanchions 58 extending downwardly from the undersurface thereof in spaced parallel relationship, each of the stanchions having an aperture 60 provided therein. The stanchions 58 are spaced along the axis through the apertures in amounts sufficient such that the trunnions 48 of yoke 44 may be journalled in the apertures 60 to permit the touch frame 56 to be pivotally moved about an axis passing through the trunnions 48 and also pivotally moved with the yoke 44 about an axis at right angles to the axis through trunnions 48. The outer periphery of the touch frame 56 is sized so as to closely interfit the periphery of the cavity 14; and, the touch frame 56 is nested about the selector lever 34 to permit movement of the lever freely therein.

Movement of the touch frame 56 about either set of trunnions causes the undersurface of the touch frame 56 to contact a set of the convex surfaces 54 on actuator frame 50 and thus depresses one side of the actuator frame 50, depending upon which side of the touch frame 56 has been depressed. When one side of the frame 50 is depressed, the corresponding pair of pins 52 in the corners thereof are extended further downwardly into the switching cavity 16.

Referring to FIG. 1, the switching mechanism indicated generally at 20 comprises a printed circuit board 62 attached to a body cover member 64, preferably by means of staking the ends of a plurality of electrical terminal members identified by reference numeral 65 through 71 which each have one end thereof received through cover member 64 and the board 62.

Figure 5:
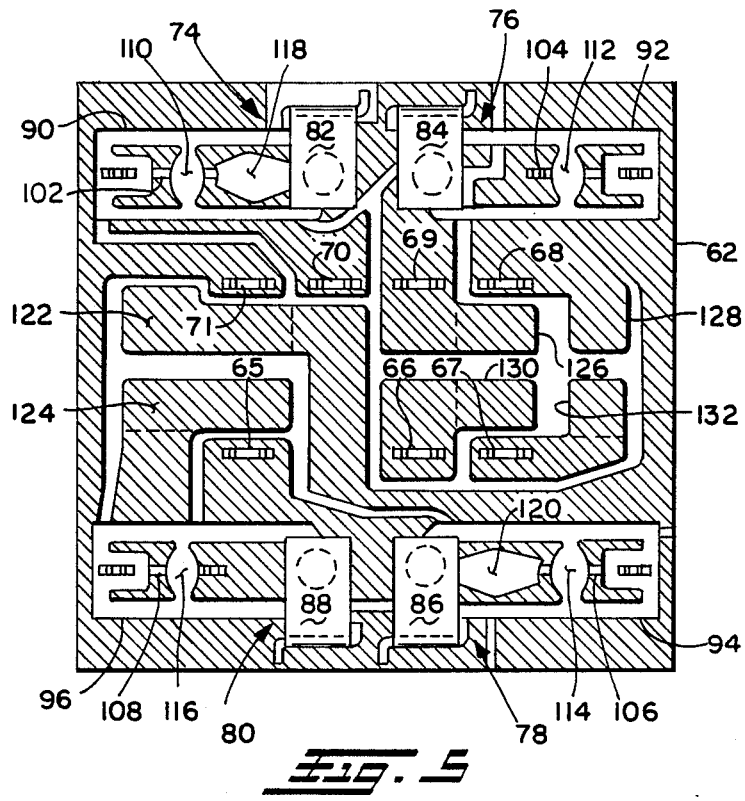
FIG. 5 is a plan view of the circuit board of the assembly of FIG. 1.
Figure 6:
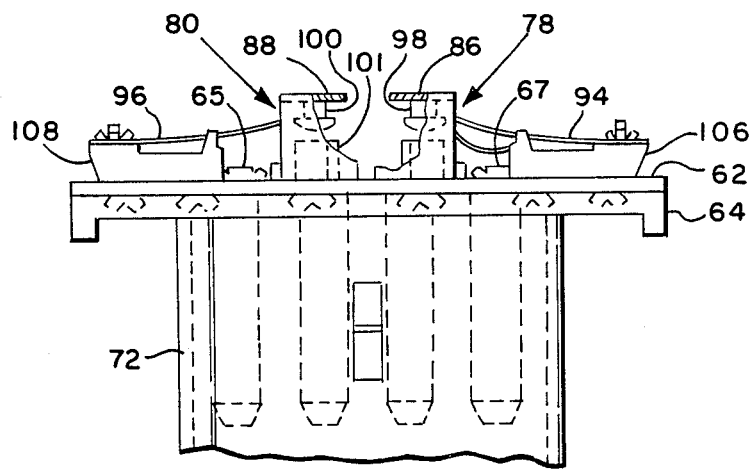
FIG. 6 is an end view taken along section indicating lines 6—6 of FIG. 1.

Referring to FIGS. 1, 5 and 6, the ends of the terminals 65–71 are shown as staked for retaining the printed circuit board 62 onto the upper surface of the body cover 64. The body cover 64 includes a shroud portion 72 which extends downwardly as shown in FIGS. 1 and 6 to provide a protective casing for the electrical terminals and for providing for attachment of an electrical harness (not shown) to the cover.

Printed circuit board 62 has four single-pole double throw switches indicated generally by the reference numerals 74, 76, 78 and 80 mounted in the corner regions of the board 62, with one side or contact of each of the switches attached to the printed circuit board directly. The other contact of each of the switches 74–80 is formed on the undersurface of a generally "L" shaped bracket having one leg thereof attached to the printed circuit board and positioned above the lower contacts as illustrated in FIG. 5, respectively, by the reference numerals 82–88 for supporting the upper contact for each of the switches. The diagonally opposite switches 74 and 78 are of the snap-acting type well known in the art; whereas, the switches 76, 80 are of the leaf type also well known in the art.

Referring to FIGS. 5 and 6, each of the switches 74–80 has a blade member indicated respectively by the reference numerals 90–96; and, each of the switch blades has a contact riveted to one end thereof, two of the contacts being illustrated and denoted by the reference numerals 98, 100, respectively attached to the ends of the blades 94, 96. Each of the blades 90–96 has the end thereof opposite the riveted contact received over and staked onto portions of a metal stanchion which is provided on the printed circuit board as indicated respectively, by the reference numerals 102–108.

Each of the switch blade members 90–96 has respectively, an actuator portion indicated respectively by the reference numerals 110, 112, 114, 116. Each of the actuator portions is disposed directly under one of the apertures 22 and is contacted by one of the pins 52 from the actuator frame 50 upon movement of the touch frame 56 in such a manner as to cause any two of the adjacent pins 52 to be extended through the apertures 22 in the body.

The switches 74, 78, as mentioned above, are snap-acting switches and each has a toggle spring indicated by the reference numerals 118, 120 for effecting snap actuation upon movement of the actuators as 110, 114 in a manner well known in the art. It will be understood that irrespective of which side of the touch frame 56 is depressed, two of the switches 74–80 will be actuated; and, in view of the diagonally oppositely disposition of the snap-acting switches 74, 78 one of the two switches actuated will be one of the snap-acting switches 74, 78.

It will be understood that the metal conductive portions of the printed circuit board 62 are illustrated cross-hatching in FIG. 5; and, the areas denoted by the reference numerals 122, 124 are exposed on the surface of the printed circuit board to provide stationary electrical contact surfaces or pads as will be described hereinafter and each pad serves as the common terminal for an auxiliary pair of single-pole double-throw switches. A corresponding pair of second exposed metal contact surfaces or pads are provided spaced on the printed circuit board for the pad or surfaces 122, and the second pads are denoted respectively by the reference numerals 126, 128. An additional pair of spaced pads or surfaces are provided for pad 124 and these are denoted by the reference numerals 130, 132 and which provide single pole double throw switching action in combination with the wiping surface or pad 124 as will hereinafter be described.

Referring to FIG. 1, a wiper indicated generally at 134 has a slided block 136 which has a central aperture or slot 138 provided therein and has received therein the curved end portion 38 of the arm 36 from selector lever 34 (see FIG. 2). Block 136 has a pair of smaller apertures 140, 142 on opposite sides of the aperture 138. Each of the apertures 140, 142 has received therein a generally U-shaped portion of a wiper spring contact indicated by the reference numerals 144, 146. The ends of the wiper springs 144, 146 each have thereon a curved portion for contacting the electrical switching pads on the printed circuit board. In particular, the end 148 of the wiper 144 makes contact and switches between the electrical pads 130, 132; and, the end 150 of wiper spring 146 makes contact with and switches between electrical pad 126, 128 on the circuit board. The opposite end of the wiper springs 144, 146 are denoted respectively by reference numerals 152, 154 and respectively make continuous contact with the electrical pads or surfaces 124, 122 on the printed circuit board. The wipers 142, 144 thus act as shorting bars between the pairs of contact on the printed circuit boards giving a single-pole double-throw switching action when the slider assembly 134 is moved by the actuator member 34.

Referring to FIGS. 4, 5 and 6, the operation of the switch assembly of the present invention will be described in connection with remote operation of a pair of servomotors in forward and reverse rotation for adjusting respectively left and right vehicle outside rearview mirrors. In the circuit diagram of FIG. 4, the circuitry mounted on the switch assembly printed circuit board 62 is illustrated as bounded by a dashed outline. The mirror servomotors which form no part of the invention are denoted by the reference characters $H_L$ for the lefthand mirror horizontal adjustment motor, $H_R$ for the righthand mirror horizontal adjustment motor, $V_L$ for the lefthand mirror vertical adjustment motor and $V_R$ for the righthand mirror vertical adjustment motor. The motors are connected to the switch assembly by a wiring harness illustrated in FIG. 4 as comprising a three pin connector and a four pin connector for connecting to the terminal pins 65–71 of the switch assembly. It will be understood, however, that a single seven pin connector may be provided on the motor wiring harness (not shown) for connection over the pin shell 72 on the switch assembly.

In operation, where it is desired to adjust the position of the righthand rear view mirror in the "UP" direction, the selector lever 34 is moved to the position for selecting the "RIGHT" switching position which causes the slider 134 to move to a position shunting between electrical pad 122 and 126 and between electrical pad 124 and 132. The touch bar 56 is then depressed on one side so that two of the pins 52 actuate switches 74 and 76. Electrical current then flow from the supply voltage $V_B$ through pin 70 of the terminal connector, through the common contact of switch 74, through switch 76, switch contact 122, wiper 152 and contact 126 through connector pin 69, through the wiring harness to the motor $V_R$, through connector pin 65 to the common contact of switch 78 (which is in the unactuated condition) through pin 71 of the connector to the external negative ground.

For "DOWN" operation of the righthand rearview mirror, the selector switch 34 remains in the "RIGHT" position, and the touch bar 56 is depressed on its opposite side from th UP operation to cause a pair of the pins 52 to actuate switches 78 and 80. In this condition of the switch assembly, current flows from the supply $V_B$ through pin 70, to the actuated contact of switch 78, through the common contact of switch 78, out through terminal connector pin 65, through the external wiring harness and the motor $V_R$, wiper 146 and contact 122 of the selector switch, through the common contact of switch 76 and through the actuated contact to connector terminal pin 71 and ground. It will be understood that although current flows through switch 76, the switch remains in the unactuated condition; whereas, although switch 80 has been actuated, no current flows through the switch in the "DOWN" mode of operation.

For leftward adjustment of the righthand rearview mirror, the selector switch 34 remains in the "RIGHT" position and an adjacent side of touch bar 56 is depressed to cause two of the pins 52 to actuate switches 74 and 80. In this condition, current flows from the supply $V_B$ through connector terminal pin 70, through the common contact of switch 74, through the actuated contact of switch 74 to the actuated contact of switch 80, through the common contact of switch 80 and through pads 124, wiper 144, pad 132 of the selector switch and outwardly through pin 67 of the connector terminal. The current flows through the external wiring harness through the motor $H_R$, through the terminal connector pin 65 to the common contact of switch 78, through the actuated contact 86 of switch 78 and through the connector pin 71 to the external negative ground.

For rightward adjustment of the righthand rearview mirror, the selector switch 34 remains in the "RIGHT" position and the opposite side of touch bar 56 is depressed to cause a pair of pins 52 to actuate switches 78 and 76. In this condition, current flows from supply $V_B$ through connector terminal pin 70, through the actuated contact of switch 78, through the common contact of switch 78, and outwardly through connector terminal pin 65 to the external wiring harness, through the motor $H_R$ and returns to connector terminal 67, to wiper pad 132, through wiper 144, wiper pad 124 and through the common contact of switch 80, through the unactuated contact of switch 80 and outward through connector terminal pin 71 to the external negative ground.

For adjustment of the lefthand rearview mirror, the selector switch 34 is moved to the "LEFT" position causing the slider 134 to move to a position in which shunt wiper to makes a connection between wiper pads 128 and 122 and shunt wiper 144 makes a connection between wiper pads 130 and 124.

For adjustment of the lefthand rearview mirror in the "UP" position, the selector switch 34 remains in the "LEFT" position; and, the touch bar is depressed to cause pins 52 to actuate switches 74 and 76. In this condition, current flows from the supply $V_B$ through connector terminal pin 70, through the common contact of switch 74, through the actuated contact of switch 74 to the actuated contact and common contact of switch 76, through wiper 122 and outwardly through connector terminal pin 68 to the external wiring harness. Current in the external wiring harness flows through adjustment motor $V_L$ and returns through connector terminal pin 65 to the common contact of switch 78 and through the unactuated contact of switch 78 to connector terminal pin 71 and to the external ground.

For adjustment of the lefthand rearview mirror in the "DOWN" position, the selector switch 34 remains in the "LEFT" position; and, the touch bar 50 is depressed on the opposite side to cause a pair of the pins 52 to actuate switches 78 and 80, as is the case for downward adjustment of the righthand mirror. In this condition, current flows from the supply $V_B$ through connector terminal pin 70, through the actuated contact of switch 78 and through the common contact of switch 78, outward through connector terminal pin 65 to the external wiring harness. Current flows in the external wiring harness through the motor $V_L$ and returns to the connector through pin 68 and to the wiper pad 128 and through wiper 146 to electrical terminal pad 122 and through the common contact of switch 76, through the unactuated contact of switch 76 and outward through connector pin 71 to the external negative ground. It will be understood that in this condition, although switch 80 is moved to the actuated condition, no current flows through the switch in this mode of operation.

For leftward adjustment of the lefthand rearview mirror, the selector switch remains in the "LEFT" position; and, the touch bar 56 is depressed to cause a pair of pins 52 to actuate switches 74 and 80. In this condition, current flows from the supply $V_B$ through terminal pin 70 to the common contact of switch 74, through the actuated contact of switch 74 to the actuated contact of switch 80, through the common contact of switch 80 to terminal pad 124, wiper 144 and terminal pad 130 and outward through connector pin 66 to the external wiring harness. Current flows through the external wiring harness through motor $H_L$ and through the connector pin 65 to the common contact of switch 78, through the unactuated contact of switch 78 and through the connector terminal pin 71 to the external negative ground.

For rightward adjustment of the lefthand rearview mirror, the selector switch 34 remains in the LEFT position and the opposite side of touch bar 56 is depressed to cause a pair of the pins 52 to actuate switches 78 and 76. In this condition, current flows from the supply $V_B$ through terminal pin 70 to the actuated contact of switch 78, through the common contact of switch 78 and out through terminal connector pin 65 to the external wiring harness. Current flow in the external wiring harness through motor $H_L$ and re-enters through connector pin 66 to the wiper pad 130 and flows through wiper 144 to terminal pad 124 and to the common contact switch 80, through the unactuated contact of switch 80 and to connector terminal pin 71 and then to the external negative ground.

The present invention thus provides a unique and novel switch assembly for remote operation of plural electric servomotors and provides for selection of the particular motor to be operated and also for forward and reverse operation of the motor. The switch assembly of the present invention employs a pivoted lever for moving a sliding wiper type selector for selecting among the motors, as for example, left and right rearview mirror adjustment motors, a quadrilateral touch frame or bar which surrounds the selector lever, is depressed on one side for the desired direction of rotation of the selected motor.

The touch bar or frame is gimballed on the switch body about a pair of mutually orthogonal axes by means of a yoke frame gimballed on one axis to the touch frame and on the opposite axis to the switch housing to thus give two degress of freedom of rotation to the touch frame about two axes. A floating actuator frame is provided pins extending therefrom for actuating a selected pair of four switches mounted on a printed circuit board. Two of the diagonally opposite switches are provided with a snap-action and are disposed such that depression of one side of the touch bar causes the actuator frame pins to actuate one snap-acting and one non-snap-acting switch. This feature thus provides for actuation simultaneously of two switches with only one audible sound from the switch having the snap-acting mechanism.

The switch assembly of the present invention thus provides a compact and low cost switch assembly for remotely controlling left and righthand rearview mirror adjustment motors from a common switch assembly. It will be understood, however, that the switch assembly of the present invention may be utilized in other applications where it is desired to control forward and reverse operations of four separate servomotors to be selected in pairs for mode function.

Although the invention has been described hereinabove with respect to the illustrated embodiments, it will be understood that the invention is capable of modification and variation and is limited only by the following claims.

We claim:

1. A plural position electrical switch assembly comprising:
    (a) a switch housing having a partition with a first aperture separating an actuator cavity from a switching cavity with a pair of spaced stanchions extending from said partition;
    (b) an actuator frame having four spaced pins extending therefrom in a common direction, said frame received in said actuator cavity with said pins each extending through one of a plurality of second apertures in said partition to said switching cavity;

(c) a yoke having a first and second pair of oppositely disposed aligned trunnions, with each of said first pair of yoke trunnions journalled in one of said stanchions for gimballing said yoke about a first axis;

(d) a touch frame having a pair of spaced second stanchions extending therefrom with one of said second pair of yoke trunnions journalled in said second stanchions, and operative for gimballing said touch frame about a second axis generally normal to said first axis;

(e) printed circuit means having four spaced switches disposed thereon each having a discrete actuator, said printed circuit means having two pairs of spaced switch pads thereon, said printed circuit means disposed in said switching cavity with each of said discrete actuators aligned with one of said four pins for switch actuation by said one pin;

(f) a slider having a pair of spaced wipers disposed thereon and operative upon sliding movement for switching between said pairs of switch pads on said printed circuit means; and, (g) a selector member pivotally disposed in said actuator cavity and having an arm portion thereof extending through said partition first aperture and engaging said slider and operative upon pivotal movement for effecting movement of said slider and switching between said pads, said selector member having a second portion thereof extending through said actuator frame, said yoke and said touch frame for permitting user access to said selector member, such that user actuation of said touch frame causes movement of said actuator frame and selected ones of said pins for actuating a pair of said four spaced switches.

2. The switch assembly defined in claim 1, wherein two of said four switches are snap-action switches.

3. The switch assembly defined in claim 1, wherein said yoke is nested in said actuator frame.

4. The switch assembly defined in claim 1, wherein said yoke, actuator frame and touch frame have a quadrilateral configuration.

5. The switch assembly defined in claim 1 wherein said touch frame has a quadrilateral configuration and user actuation of any one side thereof causes said pins to actuate two of said four spaced switches, with one of said two comprising a snap-action switch.

6. The switch assembly defined in claim 1, wherein said actuator frame has a plurality of spaced convex portions formed thereon for being contacted by said touch frame upon user actuation of said touch frame.

7. The switch assembly defined in claim 1, wherein each of said actuator frame pins has a coil spring thereon, said spring operative to bias said actuator frame, yoke and touch frame to the unactuated state.

8. A multi-position switch assembly comprising:
(a) a switch housing having an actuator cavity and a switching cavity, said cavities separated by a partition having a plurality of apertures therethrough; said actuator cavity having a pair of spaced stanchions extending therein;

(b) an actuator frame having four spaced pins extending therefrom, said actuator frame received in said actuator cavity with each of said pins extending through one of said apertures in said partition;

(c) a yoke having a first and second pair of oppositely disposed aligned trunnions, with each of said first pair journalled in one of said stanchions for gimballing said yoke about a first axis;

(d) a touch bar adapted for manual user depression, said bar having a pair of spaced second stanchions extending therefrom with each of said second pair of yoke trunnions journalled in one of said second stanchions, and said bar is gimballed on said yoke about a second axis generally normal to said first axis; and, (e) printed circuit means having four spaced switches each having a discrete actuator member, said printed circuit means disposed in said switching cavity with each of said discrete switches actuator members aligned with one of said pins for actuation and deactuation of one of said switches by an adjacent pin upon user movement of said touch bar about one of said gimbal axes.

9. The switch assembly defined in claim 8, wherein said yoke is nested centrally in said actuator frame.

10. The switch assembly defined in claim 8, wherein two of said four switches comprise snap-acting switches; and, movement of said bar in any one direction about said first and second axes causes said actuator frame pins to actuate two of said four switches including one of said snap-acting switches.

11. The switch assembly defined in claim 8, wherein each of said four switches is a single pole double throw switch.

* * * * *